United States Patent [19]
Casey, Jr et al.

[11] 3,864,168
[45] Feb. 4, 1975

[54] ELECTROLYTIC CELLS INCORPORATING WATER SCAVENGERS

[75] Inventors: John E. Casey, Jr; Roland F. Chireau, both of Stonington, Conn.

[73] Assignee: Yardney International Corp., Los Angeles, Calif.

[22] Filed: Mar. 22, 1974

[21] Appl. No.: 453,589

[52] U.S. Cl. ............................ 136/6 LN, 136/100 R
[51] Int. Cl. ......................................... H01m 43/00
[58] Field of Search ..... 136/6 LN, 20, 83 R, 100 R, 136/154, 161, 22, 121

[56] References Cited
UNITED STATES PATENTS

| | | | |
|---|---|---|---|
| 3,043,896 | 7/1962 | Herbert et al. | 136/154 X |
| 3,508,966 | 4/1970 | Eisenberg | 136/6 LN |
| 3,536,532 | 10/1970 | Watanabe et al | 136/121 X |
| 3,769,092 | 10/1973 | Dechenaux | 136/100 R |

Primary Examiner—Anthony Skapars
Attorney, Agent, or Firm—Donald E. Nist

[57] ABSTRACT

An improved electrolytic cell comprises a metal anode such as lithium, sodium, zinc, or the like, a cathode such as monofluorographite or the like and an organic electrolyte such as propylene carbonate which contains an inorganic salt such as lithium perchlorate disposed between and in contact with the spaced electrodes. A particulate water scavenger is disposed in association with the electrolyte and/or at least one of the electrodes for the purpose of maintaining the water level of the electrolyte below that which interferes with the optimal electrical performance of the cell. In one embodiment, the scavenger comprises a porous sheet disposed on a surface of the anode and exposed to the electrolyte. In another embodiment, the scavenger is disposed within the cathode. Preferably, the scavenger comprises molecular sieve material, hydrophilic cellulosic material or the like.

19 Claims, 4 Drawing Figures

3,864,168

ELECTROLYTIC CELLS INCORPORATING WATER SCAVENGERS

BACKGROUND OF THE INVENTION

1. Field of the Invention

The present invention generally relates to cells and more particularly relates to improved electrolytic cells incorporating water scavengers.

2. Prior Art

Conventional organic electrolyte-containing electrolytic cells, such as those of the lithium-monofluorographite type which include propylene carbonate as the electrolyte, are subject to inferior performance if water is present in the electrolyte. Water build-up may occur during shipping and handling of the electrolyte before sealing of the cell and is due to the fact that most organic electrolytes have a great affinity for water and usually pick up significant amounts of water from the atmosphere. Thus, most organic electrolytes are not devoid of water when introduced to the cell. As an example, propylene carbonate when obtained from a commercial manufacturer as "dry" propylene carbonate was found to include about 790 parts per million of water. This water concentration is seven times greater than the maximum acceptable for proper cell performance in a lithium-monofluorographite electrolytic cell.

Water in the organic electrolyte reduces the charge retention of the cell, cuts down the cell wet life and generates a passivating film on the negative electrode which lowers the discharge voltage of the cell. When water is initially present in the electrolyte, the electrical properties of the cell are degraded, a very undesirable result. Although the cell is sealed off from the atmosphere once the electrolyte is introduced into it, cell performance is still impaired if the electrolyte is not initially dry. Moreover, the usual methods of water removal from organic electrolytes are relatively expensive and time consuming. Accordingly, the electrolyte usually is not stripped of its water before use thereof and water interference with the cell operation is allowed to occur.

It would be desirable to provide a simple, inexpensive way of properly protecting an organic electrolyte containing electrolytic cell by removing or otherwise controlling the amount of water in the electrolyte during use of the cell, thereby assuring maximum cell performance over an extended period of time.

SUMMARY OF THE INVENTION

The present invention satisfies the foregoing needs. In this regard, an improved electrolytic cell is provided which is substantially as set forth in the Abstract above. The cell employs a particulate water scavenger in one form or another, for example, in the form of a thin porous sheet disposed between the electrolyte and at least one of the electrodes of the cell. In another embodiment, the scavenger is added directly to other components during fabrication of at least one of the electrodes so that the scavenger becomes disposed throughout the electrode and has a continuing water scavenging effect.

The scavenger preferably comprises a natural or synthetic hydrophilic zeolite or a hydrophilic cellulose fiber or modified fiber material such as anionic crosslinked sodium carboxy methyl cellulose. When the molecular sieve or absorbant fibrous material is used in sheet form, the sheet is sufficiently porous to permit the passage of the electrolyte therethrough and into contact with the electrode(s) covered by the sheet. The scavenger exerts a continuing effect and is present in a concentration sufficient to reduce the water initially present in commercially dry organic electrolyte to well below about 80 parts per million and to maintain the water level below that figure. The scavenger is inexpensive, does not interfere in any deleterious way with the electrical operation of the cell, is relatively small in weight and volume and can easily be incorporated in the cell before or after the fabrication of the components of the cell. Further advantages of the invention are set forth in the following Detailed Description and the accompanying Drawings.

DRAWINGS

DETAILED DESCRIPTION

Figure 1:
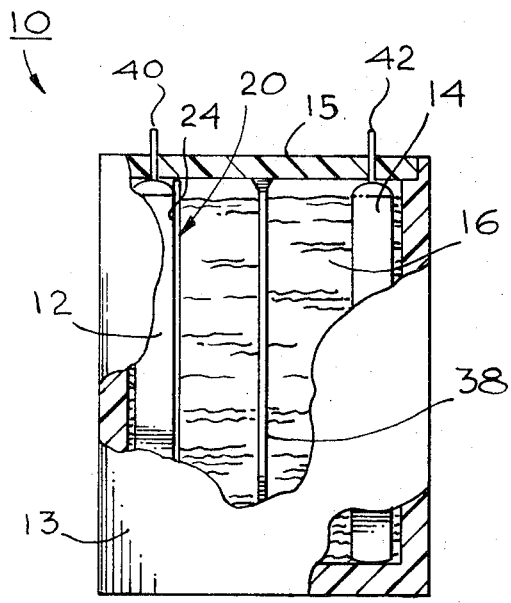
FIG. 1 is a schematic side elevation of a preferred embodiment of the improved electrolytic cell of the invention, portions being broken away to illustrate certain features thereof.

In accordance with the present invention, an improved electrolytic cell is provided such as is schematically illustrated in FIG. 1 in side elevation. As shown in FIG. 1, cell 10 includes a metallic anode 12 disposed within a container 13 having a removable top closure 15. The anode may be any suitable metal such as lithium, sodium, zinc, magnesium, aluminum or the like. The anode may be in any suitable size or shape and is spaced from the cathode 14 in cell 10, which cathode also may be of any suitable size and shape.

The cathode 14 may comprise any suitable material which, in combination with the anode and organic electrolyte 16 utilized in the cell 10, provides the desired electrical cell characteristics. In this regard, for example, one suitable form of cathode 14 where a lithium anode 12 is provided is a monofluorographite cathode such as is particularly described in U.S. Pat. No. 3,536,532 issued Oct. 27, 1970. As set forth in that patent, the monofluorographite has a chemical composition generally designated as $(CF_x)_n$ where $x$ is greater than 0.5 and less than 2.0. The monofluorographite ranges in color from dark gray to white, depending on the level of fluorine therein, is commercially available and can be manufactured, for example, by heating 200 mesh graphite powder in a nickel-reactor to about 450°C while bleeding off air and introducing fluorine slowly into the reactor for 2 hours while maintaining a pressure of 0.8 atmosphere.

Suitable cathodes 14 can also include, for example, chromium trioxide, copper chloride ($CuCl_2$), silver chloride ($AgCl_2$) and nickel chloride ($NiCl_2$). It will be understood that other suitable anodes and cathodes can be selected which will perform satisfactorily in the electrolytic cell of the present invention.

The organic electrolyte 16 utilized in the present cell may comprise, for example, propylene carbonate, ethylene carbonate, tetrahydrofuran, dioxane, tetrahydropyran or the like. The electrolyte 16 of choice will depend on the particular cathode and anode used in the cell. For example, propylene carbonate has been used successfully with a lithium anode and a monofluorographite cathode. Ethylene carbonate has been used with a sodium anode and chromium trioxide cathode. Cells employing zinc anodes and copper chloride cathodes can include tetrahydrofuran electrolyte while dioxane can be utilized as an electrolyte for a magnesium anode and silver chloride cathode-containing cell. Tetrahydropyran can be used with an aluminum anode and a nickel chloride cathode. The above specifically enumerated electrolytes 16 are generally interchangeable as are certain of the enumerated anode 12 and cathode 14 pairs.

In accordance with the present invention, the improved electrolytic cell 10 includes a solid water scavenger 18 in finely divided particulate or fiber form. As used hereinafter, the word "particulate" shall mean either or both forms. Thus, the water scavenger may comprise one or a mixture of molecular sieve materials such as strongly hydrophilic natural and synthetic zeolites. Alternatively, the particulate water scavenger 18 can be, for example, Linde Type 3A, 4A and 5A molecular sieves. Organic fibers or particles of a hydrophilic nature such as ethyl cellulose, uncross-linked carboxy methyl cellulose and cross-linked carboxy methyl cellulose can be used as the scavenger 18. Other suitable cellulosic-derived fibers or particles of rapidly absorbing large quantities of water are the following: guar gum, gum tragacanth and gum arabic.

Figure 2:
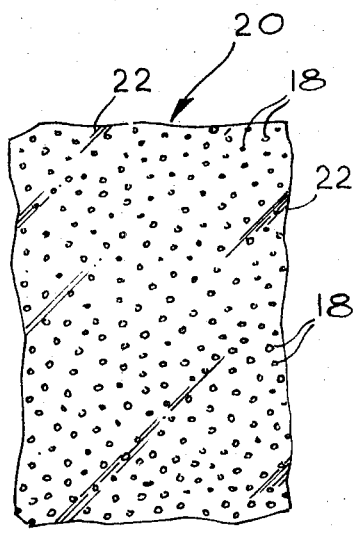
FIG. 2 is an enlarged schematic front elevation of a first embodiment of the water scavenger sheet of FIG. 1.

In the embodiment of FIG. 1, the water scavenger 18 is incorporated in a sheet 20. As one species of sheet 20, there is shown schematically in enlarged side elevation in FIG. 2 synthetic zeolite molecular sieve water scavenger material 18, ground to a powder in the range of 40 – 60 microns average diameter and uniformly disposed within a suitable binder 22, for example, tetrafluoroethylene. The sheet 20 can be fabricated, for example, by mixing the zeolite molecular sieve material 18 with an emulsion of the polytetrafluoroethylene binder 22 and then spreading the mixture out to form a thin film which, upon drying, has an ultimate thickness of 4 – 10 mils. The binder 22 is normally used in the sheet 20 in a concentration of about 20 – 50% by weight of the sheet 20, the zeolite scavenger 18 comprising the remainder of the sheet 20. The resulting sheet 20 is highly porous, having an average porosity of 25 to 35%.

This thin sheet 20 is disposed within the electrolytic cell 10 at a position which interposes it between at least a portion of at least one of the electrodes, preferably the anode 12 and the electrolyte 16 which extends between the two electrodes. Normally the sheet 20 is placed against that face 24 of the anode 12 which is directly exposed to the electrolyte 16, as shown in FIG. 1. However, other arrangements can be used, for example between the separator 38 and the cathode 14, or as a liner around the inside of the cell.

Figure 3:
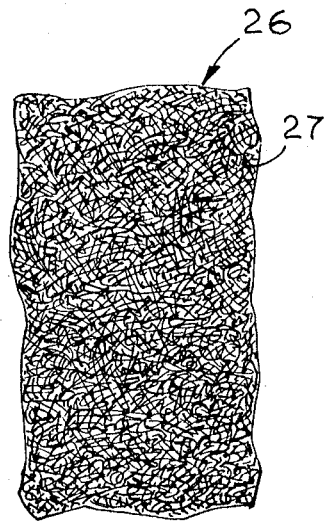
FIG. 3 is an enlarged schematic front elevation of a second embodiment of the water scavenger sheet of FIG. 1.

A modified scavenger sheet 26 is shown schematically in FIG. 3. Sheet 26 is formed of a, for example, 10 – 20 mil thick mat of strongly hydrophilic and water absorbant material 27, such as cross-linked or uncross-linked carboxy-methyl cellulose fiber or ethyl cellulose fibers or the like. In such instance, the sheet 26 can be formed without a binder by a typical papermaking method employing an organic solvent instead of water as the suspending agent for the modified cellulose. In carrying out the fabricating method, a slurry of fibers 27 of the modified cellulose in the suspending agent can be passed over the porous wire on a fourdrinier machine, so that the suspending agent runs through the wire while a wet mat of the fibers 27 builds upon the top surface of the wire. This mat is then dried out to form the desired porous scavenger sheet 26. Such a sheet may have an average porosity of, for example, 20 to 60%. Sheet 26 is used in the same manner as sheet 20 and has the same properties.

Figure 4:
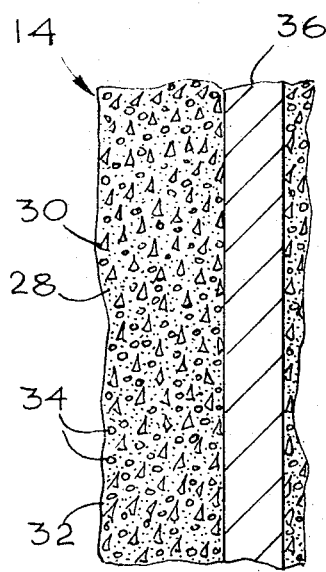
FIG. 4 is an enlarged schematic side elevation of a portion of the anode of FIG. 1 containing water scavenger particles.

As shown schematically in FIG. 4, the scavenger 18 may also be used, if desired, by incorporating it into one or both of the cell electrodes, preferably the cathode 14, at the time of the manufacture of the electrodes. Such an arrangement can be used in addition to or in substitution for sheet 20 or sheet 26. In the embodiment of FIG. 4, a monofluorographite cathode 14 is shown. The monofluorographite for the cathode 14 can be manufactured in any suitable manner, such as that specified above. The resulting powder can then be mixed with other ingredients including the scavenger before forming the cathode 14. In the embodiment of FIG. 4, monofluorographite powder 28 is shown mixed with acetylene black particles 30, polytetrafluoroethylene 32 and the scavenger 18 in a weight ratio of 75:10:5:10. The scavenger in the mixture comprises inorganic particulate molecular sieve material 34. If an organic water scavenger, namely, the hydrophilic fibrous cellulosic material, were to be used in place of the molecular sieve material, its concentration by weight would be only about one-half that for the molecular sieve material because of the greater bulk of the organic scavenger. Such organic scavenger usually is used in a particle size range of about 50 – 90 microns.

In the described mixture of FIG. 4, the polytetrafluoroethylene 32 comprises the binder while the acetylene black 30 is a suitable electrically conductive agent. This mixture is initially formed into a wet paste, with the polytetrafluoroethylene present as an emulsion. The wet paste is pressed into an expanded collector grid 36 of nickel or the like and then dried in place on the grid 36 at about 300°C. If organic water scavenger is present in the paste, the drying is carried out at up to about 120°C, so that heat degradation of that scavenger does not occur.

In typical cells made in accordance with the present invention a separator, such as a thin sheet of polypropylene or the like, usually is disposed within the electrolyte between the anode and the cathode. Such a separator sheet 38 is shown in FIG. 1. It performs the usual functions of cell separators. It will be understood that cell 10 can include conventional accessory equipment such as leads 40 and 42, as shown in FIG. 1. Further features are illustrated in the following Examples.

EXAMPLE I

An improved electrolytic cell in accordance with the present invention is fabricated utilizing an anode comprising lithium. The lithium anode, having a copper grid, has the following dimensions: 1.25-inches heighth × 0.85-inch width × 0.011-inch thickness. The anode is disposed within a hollow container of polypropylene and is spaced approximately 0.005 to 0.012 inch from a monofluorographite cathode. The cathode has the following dimensions: 1.25-inches heighth × 0.85-inch width × 0.021 thickness.

The cathode comprises a mixture which includes monofluorographite powder of indefinite average particle diameter, and a chemical composition of $(CF_x)_n$ where $x$ is $0.25 < x < 2$ and $n$ is an indefinite, large number. The monofluorographite has a color of dark grey and has been manufactured in accordance with U.S. Pat. No. 3,536,532 at about 450°C from 200 mesh graphite powder in a fluorine atmosphere. The mixture comprising the cathode also includes acetylene black powder having an average particle diameter of $5\mu$ microns or larger and a water scavenger in the form of hydrophilic synthetic zeolite molecular sieve material having an average diameter of about 50 microns. Polytetrafluoroethylene is initially provided in the mixture in the form of an emulsion, rendering the mixture a wet paste which is then applied to a porous nickel screen collector grid. The paste is dried in place at 300°C, strongly adhering to the grid. The monofluorographite, acetylene black, polytetrafluoroethylene and the zeolite are in a weight ratio of 75:10:5:10 in the paste after drying of the paste.

An organic electrolyte comprising propylene carbonate is added to the cell and extends between the two electrodes. The propylene carbonate is that which is commercially available as "dried" propylene carbonate, i.e., has an initial water content of approximately 800 parts per million. When the propylene carbonate contacts the anode, the hydrophilic zeolite in the anode has the effect of removing the water from the carbonate so that the water content of the carbonate is reduced to below 80 parts per million and is maintained at or below that level during operation of the cell.

A polypropylene separator having an average thickness of about 0.003 inch is disposed between the anode and the cathode in the cell in the usual position and for the usuall purposes.

The described cell has the following electrical characteristics: an initial voltage under load of 2.2 volts, and a capacity of 0.25 AH. These characteristics are stable over the life of the cell, over one year. In contrast, a cell identical to the described cell except for the absence of a water scavenging zeolite in the cathode has essentially the same initial electrical characteristics. However, the initial voltage degrades within several minutes to about 1.5 volts and the capacity to 0.02 AH. Accordingly, the advantages of having the zeolite in contact with the electrolyte are obvious.

EXAMPLE II

An improved electrolytic cell in accordance with the present invention is fabricated of components and in a manner substantially as set forth in Example I above. However, the anode is sodium and has the following dimensions: 1.25-inches heighth × 0.85-inch width × 0.011-inch thickness. The cathode comprises chromium trioxide, is spaced from the anode and has the following dimensions: 1.25-inches heighth × 0.85-inch width × 0.011-inch thickness. The electrolyte comprises ethylene carbonate. Moreover, the chromium trioxide of the cathode is mixed during fabrication of the cathode with about 5% by weight of particulate ethyl cellulose having an indefinite average particle diameter. About 1% by weight of polytetrafluoroethylene in emulsion form is added as a binder so that the resulting mixture is in wet paste form, which is then applied to the nickel grid as described in Example I and dried in place at a temperature of 120°C to form the finished cathode. A separator of polypropylene is employed as in Example I.

The resulting improved electrolytic cell has the following characteristics: an initial voltage under load of 2.0 volts and a current density of 0.010 amp/cm$^2$. The described characteristics remain steady over 30 minutes, while a cell indentical to the described cell, except for the absence of the ethyl cellulose in the cathode, has essentially the same initial electrical characteristics but both voltage and current drop drastically after 15 minutes. Accordingly, the improved effects provided by the scavenger are well demonstrated.

In parallel tests, species of the improved electrolytic cell of the invention are fabricated and tested, each utilizing a scavenger comprising either the hydrophilic molecular sieve material described in Example I or an hydrophilic organic fiber incorporated into the anode. The cells are set forth in Table I below:

TABLE I

| ANODE | CATHODE | ELECTROLYTE | SCAVENGER |
|---|---|---|---|
| Lithium | Monofluorographite | Propylene Carbonate | Carboxy Methyl Cellulose |
| Sodium | Chromium Trioxide | Ethylene Carbonate | Synthetic Zeolite |
| Zinc | Copper Chloride | Tetrahydrofuran | Zeolite |
| Zinc | Copper Chloride | Tetrahydrofuran | Ethyl Cellulose |
| Magnesium | Silver Chloride | Dioxane | Synthetic Zeolite |
| Magnesium | Silver Chloride | Dioxane | Carboxy Methyl Cellulose |
| Aluminum | Nickel Chloride | Tetrahydropyrane | Synthetic Zeolite |
| Aluminum | Nickel Chloride | Tetrahydropyrane | Ethyl Cellulose |

In all instances the embodiment set forth in Table I above are fully functional and exhibit an extended life at full operating strength without water interference.

EXAMPLE III

An improved electrolytic cell incorporating the components in Example I is provided. However, the cell differs from that of Example I in that a separate sheet containing the zeolite is used instead of incorporating the zeolite into the cathode. Specifically, synthetic zeolite which is highly water absorbant is ground to a powder having an average particle size diameter of about 40 – 60 microns. Approximately 50 gm of this powder is mixed with about an equal amount by weight of polytetrafluoroethylene emulsion. This mixture is then rolled out into a thin sheet, approximately 7 mils thick and allowed to dry so that the final thickness of the sheet is 7 mils and its final composition by weight is about 65% zeolite and 35% polytetrafluoroethylene. The sheet has a porosity of about 30. The sheet is placed over the side of the anode which faces the electrolyte and the cathode spaced from the anode. The resulting cell has the electrical characteristics as set forth for the improved cell of Example I. The cell differs from an identical cell (except for the absence of the water scavenger sheet) in the same manner that the cell of Example I differs from the same cell minus the zeolite in the cathode. Accordingly, the advantages of the sheet are demonstrable.

EXAMPLE IV

An improved electrolytic cell is provided which utilizes the components set forth for the improved cell of Example II. However, the particulate ethyl cellulose used as the water scavenger in the cell of Example II is not incorporated in the cathode but instead is formed into a mat by the following procedure:

Full length fibers of ethyl cellulose are suspended in a isopropyl alcohol slurrying agent and the resulting slurry is passed over a fourdrinier machine wire grid so that a mat of the ethyl cellulose forms on the wire grid. This mat is removed when the mat thickness is such that, upon drying the mat, the final thickness of the mat is approximately 5 mils. This scavenger mat is used in the same manner as the scavenger sheet specified in Example III. It has the same effect on the electrolytic cell as the particulate ethyl cellulose incorporated into the cathode of the cell of Example II. Moreover, when the sheet is omitted from a cell otherwise identical, the depreciation of electrical characteristics which occurs in the cell is approximately the same as set forth in Example II for the cell not containing the particulate ethyl cellulose in the cathode.

In parallel tests, organic water scavenger mats are fabricated by the above-described papermaking process but substituting carboxy methyl cellulose, both the cross-linked and uncross-linked types, for the ethyl cellulose. Comparable results are obtained when these sheets are used in place of ethyl cellulose sheets as the water scavenger. When these sheets and ethyl cellulose sheets are used as the water scavenger in electrolytic cells containing the components (other than the scavenger) set forth in Table I of Example II, comparable improved results are obtained. Accordingly, the utility and advantages of the water scavenger sheet in the cell of the present invention are clearly demonstrated.

The preceding Examples clearly illustrate the advantages of the improved electrolytic cell of the invention over similar conventional electrolytic cells not employing the water scavenger. Thus, the improved cell is capable of full electrical performance without interference of water normally present in the so-called dried organic electrolyte. That water, if not kept below an interference level, has the effect of reducing the charge retention of the cell, cuts down the overall life of the cell and generates a passivating film on the anode which lowers the discharge voltage of the cell. Such disadvantages are clearly avoided through the use of the scavenger in accordance with the present invention.

Various modifications, alterations and additions can be made in the improved electrolytic cell of the invention and in its components and their arrangement. All such modifications, alterations and additions as are within the scope of the appended claims form part of the present invention.

What is claimed is:

1. An improved electrolytic cell comprising in combination:
   a. A metallic anode;
   b. A cathode spaced from said anode;
   c. An organic substantially water-free electrolyte containing a dissolved salt current carrier disposed between and in contact with both of said electrodes, and
   d. A particulate solid water scavenger disposed in association with at least one of said electrodes and said electrolyte.

2. The improved electrolytic cell of claim 1 wherein said scavenger comprises a porous sheet in contact with said electrolyte and one of the said electrodes.

3. The improved electrolytic cell of claim 2 wherein said sheet comprises particulate molecular sieve material disposed within a binder matrix.

4. The improved electrolytic cell of claim 3 wherein said sheet is approximately 4 – 10 mils thick, wherein said binder is present in a concentration in said sheet of about 20 –50% of weight of said sheet and wherein said molecular sieve material comprises synthetic zeolite.

5. The improved electrolytic cell of claim 3 wherein said sheet comprises organic fibers and is about 4 – 10 mils thick.

6. The improved electrolytic cell of claim 5 wherein said sheet comprises cross-linked carboxymethylcellulose.

7. The improved electrolytic cell of claim 5 wherein said sheet comprises uncrossed-linked ethyl cellulose.

8. The improved electrolytic cell of claim 1 wherein said scavenger is disposed within at least one of said electrodes.

9. The improved electrolytic cell of claim 8 wherein said scavenger comprises molecular sieve material and is disposed within said cathode.

10. The improved electrolytic cell of claim 9 wherein said sieve material comprises synthetic zeolite and is present in a concentration of at least of about 5% by weight of said cathode.

11. The improved electrolytic cell of claim 10 wherein said cathode comprises monofluorographite.

12. The improved electrolytic cell of claim 11 wherein said cathode includes acetylene black and polytetrafluoroethylene in a weight ratio, respectively, of about 10 and 5 to 75 parts of the monofluorographite and 10 parts of the scavenger.

13. The improved electrolytic cell of claim 12 wherein the particle size range of the scavenger is about 50 – 90 microns.

14. The improved electrolytic cell of claim 8 wherein said scavenger comprises organic fiber and is disposed within said cathode.

15. The improved electrolytic cell of claim 14 wherein said organic fiber comprises cellulosic fiber and is present in a concentration of at least about 1% by weight of said cathode and in a particle size range of about 50 – 90 microns.

16. The improved electrolytic cell of claim 1 wherein said anode is lithium, said cathode is monofluorographite and said electrolyte is propylene carbonate.

17. The improved electrolytic cell of claim 1 wherein said anode is sodium, said cathode is chromium oxide and said electrolyte is ethylene carbonate.

18. The improved electrolytic cell of claim 1 wherein said anode is zinc, said cathode is copper chloride and the electrolyte is tetrahydrofuran.

19. The improved electrolytic cell of claim 1 wherein said anode is aluminum, said cathode is nickel chloride and said electrolyte is tetrahydropyran.

* * * * *